2,805,232

PROCESS OF PREPARING CRYSTALLINE HYDROCORTISONE ACETATE

William H. Baade, Fanwood, and Thomas J. Macek, Springfield, N. J., assignors to Merck & Co., Inc., Rahway, N. J., a corporation of New Jersey No Drawing. Application February 26, 1954, Serial No. 412,927

6 Claims. (Cl. 260—397.45)

This invention is concerned generally with stable pharmaceutical formulations of steroid substances and with processes for preparing the same. More particularly, it relates to improved suspensions of the steroid substance, hydrocortisone acetate (also known as 17-hydroxy-corticosterone acetate) in aqueous vehicles, said suspensions having good suspendability and being adapted for ophthalmic and parenteral administration, to the novel microcrystalline hydrocortisone acetate used in making these suspensions, and to the process of preparing said microcrystalline hydrocortisone acetate by precipitation from a mixed solvent comprising water and an N,N-dialkyl-amide.

Previous attempts to prepare aqueous suspensions of hydrocortisone acetate suitable for ophthalmic use have resulted in the production of unsatisfactory products characterized as exhibiting rapid and extensive settling. This settling, characteristic of these prior hydrocortisone acetate suspensions, was excessive for an ophthalmic preparation even where the particle size distribution of the suspended solid was essentially 85–90% below ten microns. Suspensions prepared using micronized hydrocortisone acetate and also using freeze-dried hydrocortisone acetate showed somewhat less settling but such suspensions were objectionable either with respect to appearance, or as regards uniformity.

It is now discovered, in accordance with the present invention, that ophthalmic suspensions of hydrocortisone acetate characterized as exhibiting good suspendability can be prepared using a novel microcrystalline form of hydrocortisone acetate. It is further discovered that this novel microcrystalline hydrocortisone acetate can be prepared by precipitation from a mixed solvent comprising water and an N,N-dialkyl-amide such as N,N-dimethyl-acetamide and N,N-dimethyl-formamide.

It is ordinarily preferred to carry out this novel process by preparing a concentrated solution of hydrocortisone acetate in N,N-dimethyl-acetamide or N,N-dimethyl-formamide, and adding this concentrated solution to water while rapidly agitating the mixture to effect instantaneous precipitation and crystallization. The microfine precipitate thus formed is recovered by filtration, washed with water and dried to produce microcrystalline hydrocortisone acetate which ordinarily shows a particle size distribution of 90% below five microns. The concentrated solution of hydrocortisone acetate in N,N-dimethyl-acetamide is conveniently prepared by dissolving about one part of the hydrocortisone acetate in about four parts of the N,N-dimethyl-acetamide at approximately room temperature. This concentrated solution is then added to an excess of water, the amount of water preferably being approximately four times the volume of N,N-dimethyl-acetamide solution. The temperature of the water should be within the range of about 2° C. to about 25° C.; it is ordinarily preferred to adjust the temperature of the water to about 2–4° C. prior to the addition of the N,N-dimethyl-acetamide solution. Best results have been secured by maintaining the temperature below about 5° C. during the addition which should be very rapid (preferably within a period of about two minutes) whereby the hydrocortisone acetate precipitates in the form of microfine crystals. In order to obtain a maximum crystallization yield, the resulting slurry of hydrocortisone acetate in aqueous N,N-dimethyl-acetamide is preferably allowed to stand with agitation for a period of about one hour. The precipitated hydrocortisone acetate is then recovered by filtration, washed with water and dried, preferably in vacuo, at a temperature of about 90–100° C. The microcrystalline hydrocortisone acetate thus obtained has been found to possess a bulk volume of about 3.0 cc. per gram as compared with 2.3 cc. per gram found for hydrocortisone acetate prepared in accordance with prior methods. The suspendability of suspensions of this novel microcrystalline hydrocortisone acetate was tested by preparing a 2½% ophthalmic suspension, homogenizing the suspension and allowing the resulting suspension to stand for a period of about 72 hours. At the end of this standing period the "percent of settling"

$$\left(\text{i. e. } 100 \times \frac{\text{volume of supernatant liquid}}{\text{total volume of suspension}}\right)$$

was found to be 67%. A similar ophthalmic suspension of the prior art hydrocortisone acetate having a particle size distribution essentially 85–90% below ten microns showed in this settling test a "percent of settling" of about 93%.

The following example showing a detailed method for preparing this novel microcrystalline hydrocortisone acetate is illustrative of this invention, but it is to be understood that this example is given for purposes of illustration and not of limitation.

*Example*

1000 grams of hydrocortisone acetate are dissolved by means of gentle agitation, at room temperature, in 3900 cc. of N,N-dimethyl-acetamide. The resulting solution is filtered and then poured, with agitation, over a period of about two minutes, into sixteen liters of distilled water while maintaining the temperature of the resulting aqueous mixture at a temperature within the range of about 2–5° C. The resulting aqueous slurry of hydrocortisone acetate is allowed to stand with agitation for a period of about one hour and the hydrocortisone acetate is recovered therefrom by filtration. The hydrocortisone acetate is then washed with three 3-liter portions of distilled water, and the washed hydrocortisone acetate is dried in vacuo at a temperature of about 90–100° C. Ophthalmic suspensions of this hydrocortisone acetate, after homogenization, were found to possess excellent suspendability.

Various changes and modifications may be made in carrying out the present invention without departing from the spirit and scope thereof. Insofar as these changes and modifications are within the purview of the annexed claims, they are to be considered as part of our invention.

We claim:

1. The process of preparing microcrystalline hydrocortisone acetate which comprises crystallizing hydrocortisone acetate from an aqueous mixture comprising an N,N-dialkyl-amide.

2. The process of preparing microcrystalline hydrocortisone acetate which comprises crystallizing hydrocortisone acetate from an aqueous mixture comprising N,N-dimethyl-acetamide.

3. The process of preparing microcrystalline hydrocortisone acetate which comprises crystallizing hydrocortisone acetate from an aqueous mixture comprising N,N-dimethyl-formamide.

4. The process which comprises bringing a solution of hydrocortisone acetate in N,N-dimethyl-acetamide into intimate contact with water, thereby precipitating said hydrocortisone acetate in microcrystalline form.

5. The process which comprises bringing a solution of hydrocortisone acetate in N,N-dimethyl-formamide into intimate contact with water, thereby precipitating said hydrocortisone acetate in microcrystalline form.

6. The process which comprises adding a solution containing 1 part of hydrocortisone acetate dissolved in about 4 parts of N,N-dimethyl-acetamide to about 16 parts of water, while rapidly agitating the resulting mixture and maintaining the temperature of said mixture at about 2–5° C., thereby forming a slurry of hydrocortisone acetate in microcrystalline form, and recovering the microcrystalline hydrocortisone acetate from said slurry.

References Cited in the file of this patent

UNITED STATES PATENTS 2,671,750    Macek ------------------ Mar. 9, 1954

OTHER REFERENCES

Cortone and Hydrocortone News, No. 15, Merck and Co., April 1953.

Fieser et al.: Natural Products Related to Phenanthrene, 3rd. ed., pages 405–407 (1949).